United States Patent
Martineau

(10) Patent No.: US 10,726,443 B2
(45) Date of Patent: Jul. 28, 2020

(54) DEEP PRODUCT PLACEMENT

(71) Applicant: Samsung Electronics Co., Ltd., Suwon-si, Gyeonggi-do (KR)

(72) Inventor: Justin C. Martineau, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/616,290

(22) Filed: Jun. 7, 2017

(65) Prior Publication Data

US 2018/0013977 A1 Jan. 11, 2018

Related U.S. Application Data

(60) Provisional application No. 62/360,603, filed on Jul. 11, 2016.

(51) Int. Cl.
*G06F 30/20* (2020.01)
*G06Q 30/02* (2012.01)
(Continued)

(52) U.S. Cl.
CPC ......... *G06Q 30/0251* (2013.01); *G06F 30/20* (2020.01); *G06K 9/3241* (2013.01);
(Continued)

(58) Field of Classification Search
CPC ............ G06Q 30/0251; G06Q 30/0641; G06F 17/5009; G06F 2217/16; G06K 9/00744;
(Continued)

(56) References Cited

U.S. PATENT DOCUMENTS 6,100,925 A 8/2000 Rosser et al.
6,403,597 B1 6/2002 Wilson et al.
(Continued)

FOREIGN PATENT DOCUMENTS

KR 20120025211 A 3/2012
KR 101519047 B1 5/2015
(Continued)

OTHER PUBLICATIONS

International Search Report and Written Opinion dated Nov. 30, 2018 for International Application PCT/ KR2017/008745 from Korean Intellectual Property Office, pp. 1-13, Republic of Korea.
(Continued)

*Primary Examiner* — Eileen M Adams
(74) *Attorney, Agent, or Firm* — Sherman IP LLP; Kenneth L. Sherman; Hemavathy Perumal

(57) ABSTRACT

One embodiment provides a method comprising identifying a product placement opportunity for a product in a frame of a piece of content during playback of the piece of content on a display device. The method further comprises determining a location in the frame to insert product placement content for the product based on a learned statistical model representing learned placement patterns related to the product. The method further comprises modifying the product placement content based on one or more objects present in the frame, and inserting a product placement for the product in the piece of content by inserting the modified product placement content in the frame based on the location. The modified product placement content appears to occur naturally in the piece of content.

20 Claims, 9 Drawing Sheets

(51) Int. Cl.
  *G11B 27/036*  (2006.01)
  *G06Q 30/06*  (2012.01)
  *G06N 20/00*  (2019.01)
  *H04N 9/82*  (2006.01)
  *G06N 3/08*  (2006.01)
  *G06K 9/32*  (2006.01)
  *G06F 111/10*  (2020.01)

(52) U.S. Cl.
  CPC ............... *G06N 3/08* (2013.01); *G06N 20/00* (2019.01); *G06Q 30/0241* (2013.01); *G06Q 30/0641* (2013.01); *G11B 27/036* (2013.01); *H04N 9/8205* (2013.01); *G06F 2111/10* (2020.01)

(58) Field of Classification Search
  CPC ...... G06K 9/66; G06N 99/005; G11B 27/036; H04N 9/8205
  See application file for complete search history.

(56) References Cited

U.S. PATENT DOCUMENTS

| | | |
|---|---|---|
| 7,073,129 B1 | 7/2006 | Robarts et al. |
| 7,342,166 B2 | 3/2008 | Kay |
| 7,796,781 B2 | 9/2010 | Echigo et al. |
| 7,849,227 B2 | 12/2010 | Kashiyama et al. |
| 7,882,087 B2 | 2/2011 | Johnson |
| 7,994,930 B2* | 8/2011 | Gajdos ............... G06Q 30/0256 340/691.1 |
| 8,220,020 B2 | 7/2012 | Deshpande |
| 8,413,182 B2 | 4/2013 | Bill et al. |
| 8,477,246 B2 | 7/2013 | Saxena et al. |
| 8,501,422 B2 | 8/2013 | Eszter et al. |
| 8,527,345 B2 | 9/2013 | Rothschild et al. |
| 8,655,718 B2 | 2/2014 | Atsani et al. |
| 8,682,925 B1 | 3/2014 | Marquardt et al. |
| 8,745,070 B2 | 6/2014 | Krishnamurthy et al. |
| 8,850,471 B2 | 9/2014 | Kilar et al. |
| 8,910,201 B1* | 12/2014 | Zamiska ........... H04N 21/44222 725/34 |
| 8,922,617 B2 | 12/2014 | Alexandrov et al. |
| 8,949,889 B1 | 2/2015 | Erdmann et al. |
| 8,954,377 B1 | 2/2015 | Turon et al. |
| 8,977,293 B2 | 3/2015 | Rodriguez et al. |
| 9,009,083 B1* | 4/2015 | Shetty ................. G06F 9/30145 706/12 |
| 9,078,048 B1 | 7/2015 | Gargi et al. |
| 9,097,891 B2 | 8/2015 | Border et al. |
| 9,224,156 B2 | 12/2015 | Moorer |
| 9,264,711 B2 | 2/2016 | Gordon et al. |
| 9,269,015 B2 | 2/2016 | Boncyk et al. |
| 9,272,203 B2 | 3/2016 | Zalewski et al. |
| 9,272,209 B2 | 3/2016 | Perlman et al. |
| 9,286,721 B2 | 3/2016 | Adhikari et al. |
| 9,317,972 B2 | 4/2016 | Forutanpour et al. |
| 9,384,594 B2 | 7/2016 | Maciocci et al. |
| 9,584,844 B2 | 2/2017 | Onno et al. |
| 9,633,479 B2 | 4/2017 | Grasso et al. |
| 9,888,105 B2 | 2/2018 | Rhoads et al. |
| 10,091,556 B1 | 10/2018 | Liden |
| 10,163,049 B2 | 12/2018 | Tout et al. |
| 2003/0028432 A1 | 2/2003 | Troyansky et al. |
| 2006/0173743 A1 | 8/2006 | Bollay |
| 2007/0124762 A1 | 5/2007 | Chickering et al. |
| 2008/0104634 A1* | 5/2008 | Gajdos .................. G06Q 30/02 725/36 |
| 2008/0109306 A1 | 5/2008 | Maigret et al. |
| 2008/0172293 A1* | 7/2008 | Raskin ................... G06Q 10/04 705/14.1 |
| 2008/0249986 A1 | 10/2008 | Clarke-Martin et al. |
| 2009/0094113 A1 | 4/2009 | Berry et al. |
| 2010/0023398 A1 | 1/2010 | Brown et al. |
| 2010/0088716 A1 | 4/2010 | Ellanti et al. |
| 2011/0041153 A1 | 2/2011 | Simon et al. |
| 2011/0153414 A1 | 6/2011 | Elvekrog et al. |
| 2011/0173071 A1 | 7/2011 | Meyer et al. |
| 2011/0184805 A1 | 7/2011 | Margalit et al. |
| 2012/0011540 A1 | 1/2012 | Pulford et al. |
| 2012/0086727 A1 | 4/2012 | Korah et al. |
| 2012/0100915 A1 | 4/2012 | Margalit et al. |
| 2012/0167133 A1 | 6/2012 | Carroll et al. |
| 2013/0073473 A1 | 3/2013 | Heath |
| 2014/0013342 A1 | 1/2014 | Swan et al. |
| 2014/0052540 A1 | 2/2014 | Rajaram et al. |
| 2014/0063061 A1 | 3/2014 | Reitan et al. |
| 2014/0136337 A1 | 5/2014 | Ringdahl |
| 2014/0236729 A1 | 8/2014 | Sidi et al. |
| 2014/0289188 A1 | 9/2014 | Shimanovsky et al. |
| 2014/0310098 A1 | 10/2014 | Epperson et al. |
| 2014/0317244 A1 | 10/2014 | Pantos et al. |
| 2015/0081452 A1 | 3/2015 | Anthony |
| 2015/0082203 A1 | 3/2015 | James et al. |
| 2015/0082341 A1 | 3/2015 | Rosenbaum et al. |
| 2015/0172563 A1 | 6/2015 | Jakobson et al. |
| 2015/0199995 A1* | 7/2015 | Silverstein ......... H04N 21/8541 386/249 |
| 2015/0245111 A1 | 8/2015 | Berry et al. |
| 2015/0269384 A1 | 9/2015 | Holman et al. |
| 2015/0302470 A1 | 10/2015 | Dru et al. |
| 2015/0350563 A1 | 12/2015 | Hendricks et al. |
| 2016/0004750 A1 | 1/2016 | Marquardt et al. |
| 2016/0042250 A1 | 2/2016 | Cordova-Diba et al. |
| 2016/0050465 A1 | 2/2016 | Zaheer et al. |
| 2016/0092484 A1 | 3/2016 | Finkler |
| 2016/0112729 A1 | 4/2016 | Sayed et al. |
| 2016/0140614 A1 | 5/2016 | Brubaker et al. |
| 2016/0196603 A1 | 7/2016 | Perez et al. |
| 2016/0209648 A1 | 7/2016 | Haddick et al. |
| 2016/0212455 A1 | 7/2016 | Manna |
| 2017/0178156 A1* | 6/2017 | Bruich ............... G06Q 30/0201 |
| 2017/0374398 A1* | 12/2017 | Rao .................. H04N 21/23424 |
| 2018/0192160 A1 | 7/2018 | Ravindran et al. |
| 2019/0005546 A1 | 1/2019 | Chen et al. |

FOREIGN PATENT DOCUMENTS

| | | |
|---|---|---|
| WO | 2002037828 A2 | 5/2002 |
| WO | 2008062211 A1 | 5/2008 |
| WO | 2011094734 A2 | 8/2011 |
| WO | 2013170362 A1 | 11/2013 |
| WO | 2015047246 A1 | 4/2015 |
| WO | 2016028813 A1 | 2/2016 |
| WO | 2016109056 A1 | 7/2016 |

OTHER PUBLICATIONS

Cohen, E. et al., "Maintaining Time-Decaying Stream Aggregates" Jan. 25, 2005, pp. 1-16, Eisevier, United States.

Rosman, B. et al., "Learning Spatial Relationships between Objects", Journal International Journal of Robotics Research archive, Sep. 30, 2011, pp. 1328-1342, vol. 30, No. 11, See p. 1329, right column: p. 1332, right column; p. 1333, left column, United Kingdom.

International Search Report and Written Opinion dated Oct. 22, 2018 for International Application PCT / KR2018/006420 from Korean Intellectual Property Office, pp. 1-10, Republic of Korea U.S. Final Office Action for U.S. Appl. No. 15/473,272 dated Oct. 17, 2018.

U.S. Advisory Action for U.S. Appl. No. 15/473,272 dated Dec. 31, 2018.

International Search Report and Written Opinion dated Oct. 19, 2018 for International Application PCT / KR2018/007359 from Korean Intellectual Property Office, pp. 1-13, Republic of Korea.

U.S. Non-Final Office Action for U.S. Appl. No. 15/473,272 dated Mar. 26, 2018.

U.S. Notice of Allowance for U.S. Appl. No. 15/473,272 dated Jun. 12, 2019.

U.S. Notice of Allowance for U.S. Appl. No. 15/473,272 dated May 1, 2019.

(56) References Cited

OTHER PUBLICATIONS

U.S. Non-Final Office Action for U.S. Appl. No. 15/636,360 dated Mar. 22, 2019.
Extended European Search Report dated Jul. 2, 2019 for European Application No. 17889825.0 from European Patent Office, pp. 1-15, Munich, Germany.
U.S. Notice of Allowability for U.S. Appl. No. 15/473,272 dated Sep. 17, 2019.
U.S. Notice of Allowability for U.S. Appl. No. 15/473,272 dated Jul. 10, 2019.
U.S. Final Office Action for U.S. Appl. No. 15/636,360 dated Aug. 22, 2019.
U.S. Notice of Allowance for U.S. Appl. No. 15/473,272 dated Oct. 18, 2019.
Extended European Search Report dated Oct. 4, 2019 for European Application No. 17889825.0 from European Patent Office, pp. 1-11, Munich, Germany.
U.S. Non-Final Office Action for U.S. Appl. No. 15/636,360 dated Mar. 20, 2020.
Extended European Search Report dated Feb. 17, 2020 for European Application No. 18813931.5 from European Office, pp. 1-11, Munich, Germany.
Balfanz, M. F. et al., "An interactive Video System supporting E-Commerce Product Placement", Proceedings of the World Scientific and Engineering Society Conferences, 2001.

* cited by examiner

800

| Identify a product placement opportunity for a product in a frame of a piece of content during playback of the piece of content on a display device | — 801 |

↓

| Determine a location in the frame to place product placement content for the product based on a learned statistical model representing learned placement patterns for the product | — 802 |

↓

| Modify the product placement content based on one or more objects present in the frame | — 803 |

↓

| Place a product placement for the product in the piece of content by placing the modified product placement content in the frame based on the location, where the modified product placement content appears to occur naturally in the piece of content | — 804 |

FIG. 5

DEEP PRODUCT PLACEMENT

CROSS REFERENCE TO RELATED APPLICATIONS

This application claims priority from U.S. Provisional Patent Application Ser. No. 62/360,603, filed on Jul. 11, 2016, incorporated herein by reference.

TECHNICAL FIELD

One or more embodiments relate generally to product placement, and in particular, a system and a method for deep product placement.

BACKGROUND

Object placement involves intentional placement of an object in media content (e.g., movies, etc.). Advertisement is one form of object placement, where an advertiser may enter into an agreement with a media content provider to place a product promoted by the advertiser into media content produced by the media content provider. For example, showing a BMW® in a Bond movie.

Traditionally, object placement is done during production of the media content. However, such object placements cannot be changed once the production completes. Further, it is not possible to have a personalized experience to the consumers of the media content. Therefore, there is a need for a system and method that enable personalized object placements in the context of a current user experience.

SUMMARY

One embodiment provides a method comprising identifying a product placement opportunity for a product in a frame of a piece of content during playback of the piece of content on a display device. The method further comprises determining a location in the frame to insert product placement content for the product based on a learned statistical model representing learned placement patterns related to the product. The method further comprises modifying the product placement content based on one or more objects present in the frame, and inserting a product placement for the product in the piece of content by inserting the modified product placement content in the frame based on the location. The modified product placement content appears to occur naturally in the piece of content.

Another embodiment provides a method comprising, in a training stage, generating a product placement profile for a product based on one or more pieces of visual content with natural occurrences of the product, and sending the product placement profile to a display device. The product placement profile comprises product placement content for the product and one or more placement instructions for inserting the product placement content in visual content. The product placement profile allows the display device to dynamically insert a product placement for the product in a piece of content during playback of the piece of content.

These and other features, aspects and advantages of the one or more embodiments will become understood with reference to the following description, appended claims and accompanying figures.

BRIEF DESCRIPTION OF THE DRAWINGS

FIG. 5 is a flowchart of an example process for generating a dynamic product placement, in one or more embodiments;

DETAILED DESCRIPTION

Figure 1:
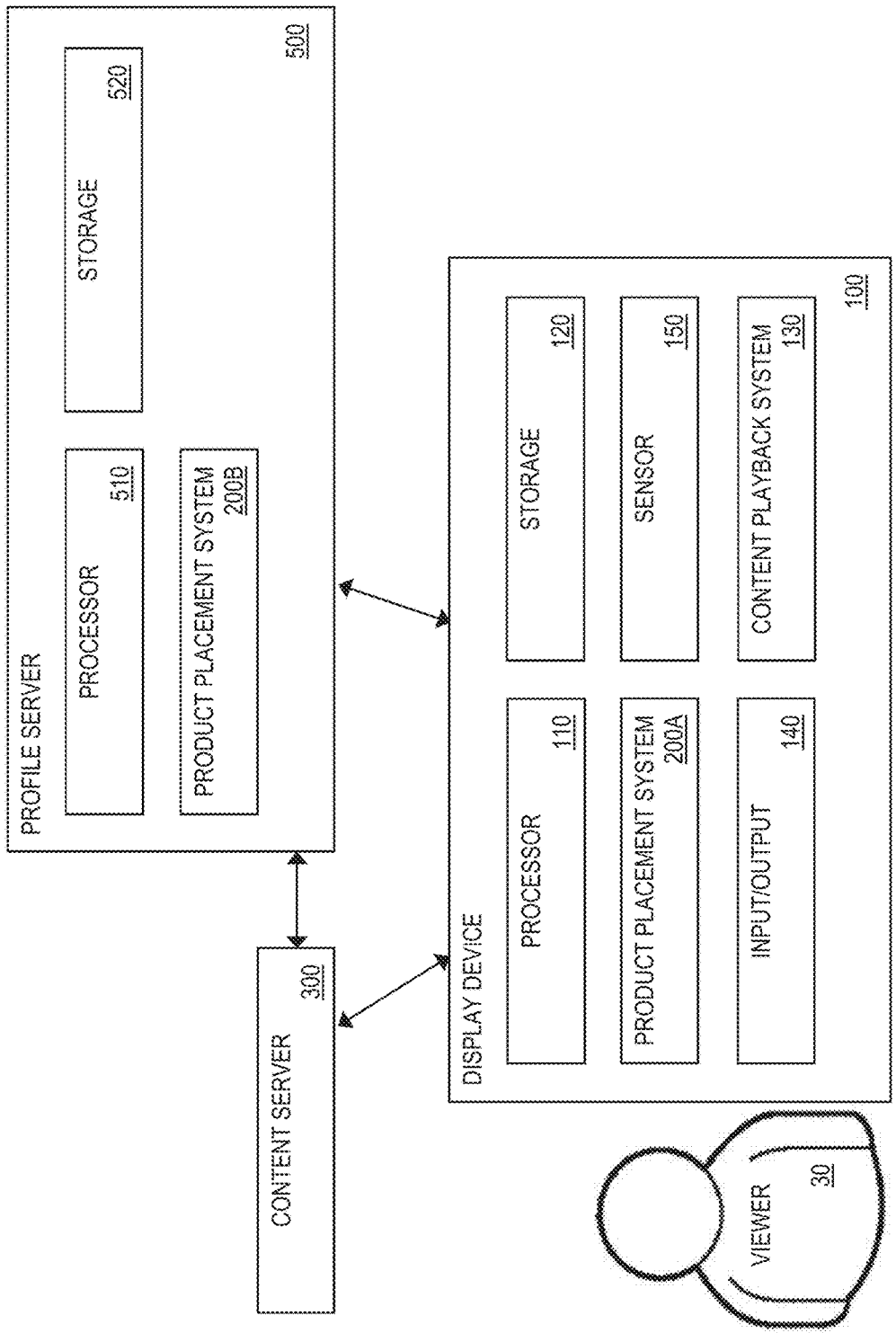
FIG. 1 illustrates an example computer architecture for deep product placement, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One embodiment provides a method comprising identifying a product placement opportunity for a product in a frame of a piece of content during playback of the piece of content on a display device. The method further comprises determining a location in the frame to insert product placement content for the product based on a learned statistical model representing learned placement patterns related to the product. The method further comprises modifying the product placement content based on one or more objects present in the frame, and inserting a product placement for the product in the piece of content by inserting the modified product placement content in the frame based on the location. The modified product placement content appears to occur naturally in the piece of content.

Another embodiment provides a method comprising, in a training stage, generating a product placement profile for a product based on one or more pieces of visual content with natural occurrences of the product, and sending the product placement profile to a display device. The product placement profile comprises product placement content for the product and one or more placement instructions for inserting the product placement content in visual content. The product placement profile allows the display device to dynamically insert a product placement for the product in a piece of content during playback of the piece of content.

For expository purposes, the term "product" as used herein generally refers to an object, action, or service promoted by an entity. Examples of products include, but are not limited to, soft drinks, cars, smartphones, cellular services, etc.

For expository purposes, the term "media content" as used herein generally refers to visual content, such as images, videos, video games, digital pictures, movies, television shows, or any other type of visual content that is displayable on a display device (e.g., a television, a monitor, tablet, smartphone, etc.). Media content may be produced by a media content provider for mass distribution (e.g., movies, television shows, etc.), or captured by an individual as a user-generated content (e.g., personal/private videos or pictures, etc.). The terms "media content" and "visual content" may be used interchangeably.

For expository purposes, the term "product placement content" generally refers to a visual and/or audio representation associated with a product, such as an image, a video, a three-dimensional (3D) structural model of the product, a song, an announcement of a promotion of the product, etc. For example, product placement content may include visual representations of a can of a soft drink brand, a person drinking a can of a soft drink brand, a commercial jingle of a soft drink brand, a car, a banner including a product, or a song playing in the background referring to the product, etc. The terms "product placement content", "object placement", and "product placement" may be used interchangeably.

For expository purposes, the term "product placement profile" generally refers to a description of when and how to place product placement content related to a product in media content.

Traditionally, as product placements are inserted into media content during production of the media content, these product placements are fixed in place in the media content ("fixed product placements"). Unlike commercials, fixed product placements in media content are not skippable and do not require an audience to expend additional time viewing the product placements. Fixed product placements in media content, however, cannot be easily changed, updated, released, personalized for an audience, or resold after production of the media content. Further, fixed product placements in media content may be risky as popularity and longevity of entertainment included in the media content are unknown factors during production of the media content. In spite of these unknown factors, an advertiser must still pay a development cost to produce product placement content.

One embodiment of the present invention provides a product placement framework enabling dynamically placing, editing, and merging product placements associated with a product in media content, such that the product placements appear to occur naturally in the resulting media content. Dynamic product placements appear natural to a viewer as products associated with the product placements take place or are placed/positioned similarly in real life (e.g., an image of a soft drink can of a particular brand may be naturally placed onto a top of a table, but not onto a top of a car). Based on learning of placement patterns from existing visual/audio content associated with a product and other similar products (e.g., products of similar type, utility, and/or shape), the framework dynamically identifies product placement opportunities representing natural places/points within the media content that product placements representing the product may be placed. The framework identifies the product placement opportunities in real time, and generates dynamic product placements by placing product placement content (e.g., images, videos, etc.) associated with the product in the natural places.

In one embodiment, the framework applies algorithms that blend generic product placement content (e.g., generic images, etc.) for a product into a scene within a media content, thereby removing the need for an advertiser to perform such work. The algorithms may be suitable for different types of media content, thereby allowing a uniform message from an advertiser to be communicated across the different types of media content with little effort.

In one embodiment, the framework generates dynamic product placements that are interactive. For example, based on viewer interaction with the product placement (e.g., push of a button), a dynamic product placement may be at least one of: disabled, rated (e.g., liked, disliked, etc.), redirected to additional content, ordered/purchased, or a combination thereof.

In one embodiment, the framework utilizes deep scene segmentation and understanding to dynamically identify potential natural product placements. A display device utilizing one or more components of the framework dynamically places product placements in media content currently playing on the display device (e.g., dynamically place product placements in a TV show as it is airing). Further, for different display devices viewed by different viewers but playing the same media content, the framework allows the different devices to dynamically place different product placements in the media content based on personal information of and/or contextual information around the viewers (i.e., different viewers viewing the same media content may view different product placements). The framework allows changes/updates to product placements in existing content.

FIG. 1 illustrates an example computer architecture 50 for deep product placement, in one or more embodiments. The computer architecture 50 comprises an electronic display device 100 including computation resources, such as one or more processor units 110 and one or more storage units 120. One or more applications may execute/operate on the display device 100 utilizing the computation resources of the display device 100. In one embodiment, the applications include, but are not limited to, a content playback system 130 for playback of media content on the display device 100.

Examples of the display device 100 include, but are not limited to, one of the following: a smart television, a monitor, a desktop computer, mobile devices such as a tablet, a smart phone, a laptop, a wearable device, etc.

In one embodiment, the applications on the display device 100 further include a device-side (i.e., client-side) deep product placement system 200A for deep product placement. In another embodiment, the deep product placement system 200A resides on a separate device connected to the display device 100 such as, but not limited to, a set-top box or another type of device connected to the display device 100. As described in detail later herein, the deep product placement system 200A is configured to dynamically place one or more product placements in media content currently displayed on the display device 100. Each product placement placed appears to occur naturally in the media content.

The display device 100 further comprises one or more other input/output (I/O) modules 140, such as a keyboard, a keypad, a touch interface, a display screen, a remote control, etc. An I/O module 140 may be integrated in or coupled to/connected with the display device 100. A viewer 30 may utilize an I/O module 140 to interact with a product placement and provide viewer feedback relating to the product placement.

In one embodiment the display device 100 further comprises at least one sensor module 150 (e.g., a camera, a microphone, etc.) for capturing contextual and/or environmental data. For example, for a camera of the display device 100 may be used to capture/record viewer impressions of a product placement. In one embodiment, the display device 100 may receive contextual and/or environmental data from one or more devices or sensors coupled to or connected with the display device 100.

In one embodiment, the display device 100 is configured to exchange data with one or more remote servers over a connection (e.g., a wireless connection such as a WiFi connection or a cellular data connection, a wired connection, or a combination of the two). Examples of remote servers the display device 100 may exchange data with include, but are not limited to, one or more profile servers 500 and/or one or more content servers 300.

A profile server 500 includes computation resources, such as one or more processor devices 510 and one or more storage devices 520. One or more applications may execute/operate on the profile server 500 utilizing the computation resources of the profile server 500. In one embodiment, the applications include, but are not limited to, a server-side deep product placement system 200B for deep product placement. As described in detail later herein, the deep product placement system 200B is configured to generate and distribute product placement profiles 521 (FIG. 2B) for use in generating product placements to the display device 100. In one embodiment, a profile server 500 may be operated/managed by an advertiser or another entity.

A content server 300 may distribute media content to the display device 100 for playback on the display device 100. A content server 300 may be operated/managed by a media content provider or another entity. A media content provider may sell one or more advertisement opportunities associated with media content produced by the media content provider, and an advertiser may purchase at least one of the advertisement opportunities.

In one embodiment, the product placement system 200A utilizes one or more learned models that are trained offline (i.e., not on the display device 100). For example, the learned models may be trained on a profile server 500 utilizing computation resources of the profile server 500. As another example, the learned models may be trained on another remote server. After training, the learned models may be loaded onto/downloaded to the display device 100 as a portion of the deep product placement system 200A. In another embodiment, the learned models are trained on the display device 100 itself.

Figure 2A:
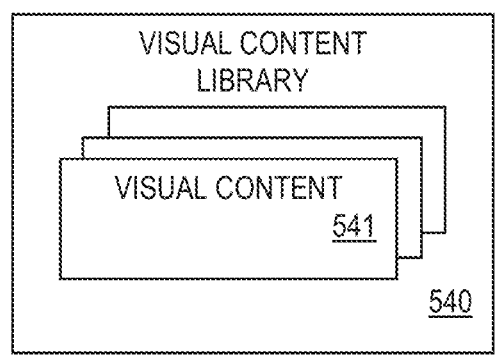
FIG. 2A illustrates an example visual content library, in one or more embodiments.

FIG. 2A illustrates an example visual content library 540, in one or more embodiments. In one embodiment, the product placement system 200B maintains a visual content library 540 comprising a plurality of visual content examples 541 with natural occurrences of one or more products. Each visual content example 541 comprises a piece of visual content including a product, wherein the product is naturally placed/positioned at a natural place/point in the piece of visual content.

In one embodiment, the visual content library 540 resides on a remote server. For example, the visual content library 540 may reside on a profile server 500. As another example, the visual content library 540 resides on a content server 300 or another remote server.

Figure 2B:
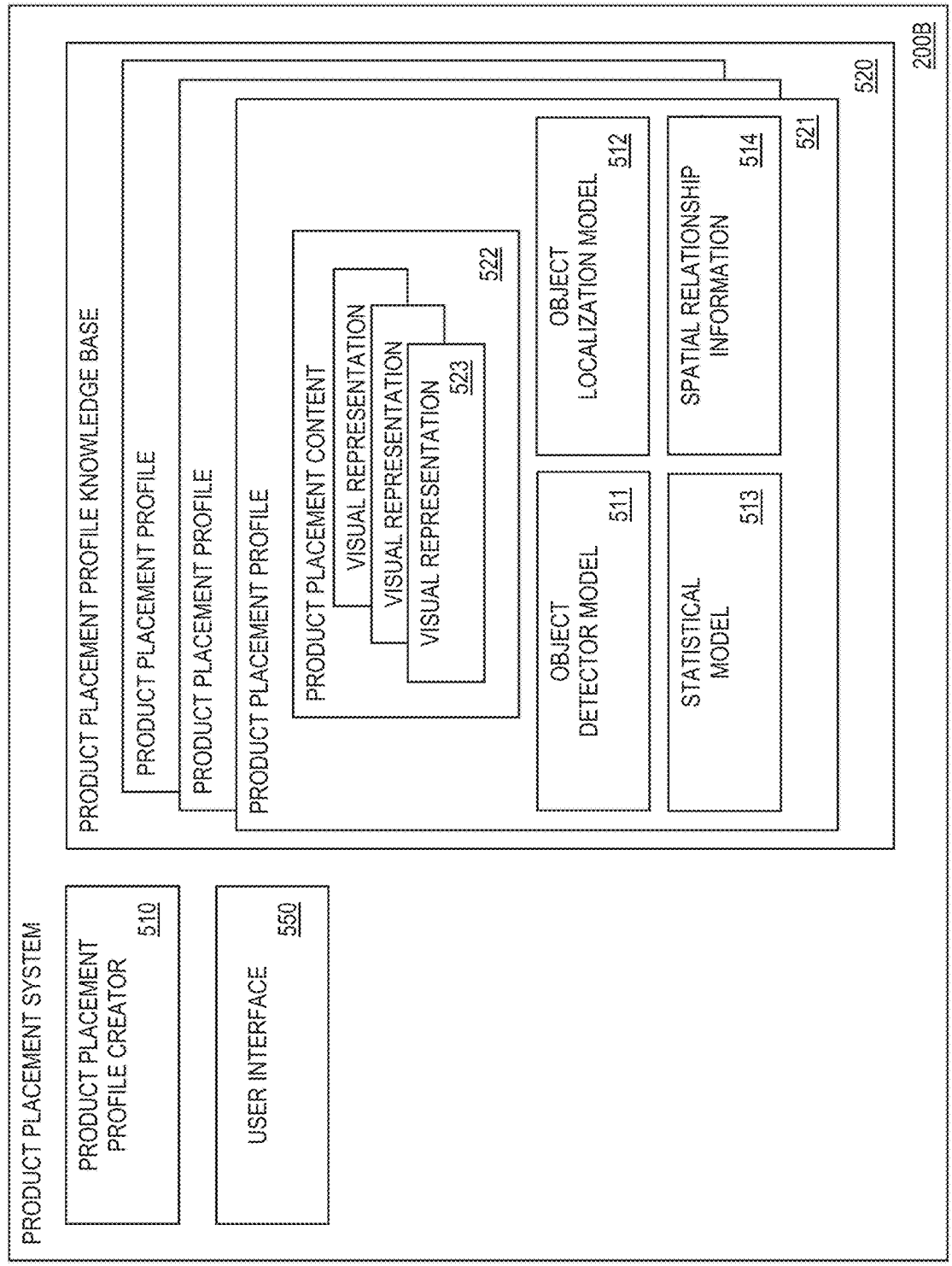
FIG. 2B illustrates an example server-side product placement system in detail, in one or more embodiments.

FIG. 2B illustrates the example server-side product placement system 200B in detail, in one or more embodiments. In one embodiment, the product placement system 200B maintains a product placement profile knowledge base 520 comprising one or more product placement profiles 521. Each product placement profile 521 corresponds to a particular product, and comprises information for use in determining where the product normally occurs, what other object normally co-occur with it (i.e., commonly associated with the product), and how a product placement for the product can be merged with media content.

In one embodiment, deep product placement occurs in the following stages/phases: (1) a training stage during which one or more product placement profiles 521 are generated, and (2) a deployment stage during which a product placement may be dynamically placed into media content currently played by the display device 100.

In one embodiment, the product placement system 200B comprises a product placement profile creator 510 configured to generate one or more product placement profiles 521. In the training stage, the product placement profile creator 510 generates a product placement profile 521 for a product in the following manner: First, the product placement profile creator 510 trains an object detector model 511 to detect/identify pieces of visual content with natural occurrences of the product based on detection training/reference data for the product. In one embodiment, the detection training/reference data comprises one or more visual representations 523 associated with the product. For example, the visual representations 523 may include one or more close-up images/photos of the product.

In one embodiment, the visual representations 523 associated with the product are obtained from an advertiser of the product. For example, the product placement profile creator 510 may remotely access a remote server maintained/managed by the advertiser to obtain the visual representations 523. As another example, the advertiser may upload the visual representations 523 to the product placement system 200B (e.g., via a user interface 550).

Next, in the training stage, the product placement profile creator 510 applies the resulting learned object detector model 511 to the visual content library 540 to identify visual content examples 541 with natural occurrences of the product (i.e., natural places/points in visual content where the product is naturally placed/positioned).

Next, in the training stage, the product placement profile creator 510 trains an object localization model 512 to determine a localization bounding box for the product based on localization training/reference data for the product. The localization bounding box defines/approximates a structural/shape outline of the product.

In one embodiment, the product placement profile creator 510 generates the localization training/reference data in the following manner: the product placement profile creator 510 analyzes the visual content library 540, selects visual content examples 541 without natural occurrences of the product, inserts visual representations 523 associated with the product in random places/points in the visual content examples 541 selected, and maintains the resulting modified visual content examples 541 as a separate copy from the visual content library 540. The localization training/reference data comprises the resulting modified visual content examples 541 and location information identifying, for each resulting modified visual content example 541, an exact/known place/point (i.e., location) in the visual content example 541 that a visual representation 523 associated with the product is randomly inserted in.

In one embodiment, the product placement profile creator 510 applies one or more state-of-the-art methods/algorithms to train an object localization model 512. For example, the product placement profile creator 510 may apply a region proposal algorithm to generate a set of candidate/proposed localization bounding boxes. Content included the candidate/proposed localization bounding boxes is provided to a neural network to identify one or more objects in the region. This may result in a set of overlapping localization bounding boxes for at least one of the objects identified; this set of overlapping localization bounding boxes may be reduced to a final localization bounding box for the object using metrics based on a size of the localization bounding box, maximum coverage, and overlap with one or more other candidate/proposed localization bounding boxes. As another example, the product placement profile creator 510 may apply an algorithm that involves scanning an image (e.g., a visual content example 541) utilizing a neural network trained to identify coordinates of two corners of a localization bounding box (e.g., the top left corner and the bottom right corner).

Next, the product placement profile creator 510 applies the resulting learned object localization model 512 to the visual content library 540 to localize the product in the visual content examples 541 with natural occurrences of the product (i.e., the visual content examples 541 identified by applying the learned object detector model 511). Applying the learned object localization model 512 to a visual content example 541 with a natural occurrence of the product results in placement of a localization bounding box around the product to localize the product. The product placement profile creator 510 then determines one or more spatial relationships, if any, of the localized product bounded by the localization bounding box to one or more other objects in the visual content example 541. The spatial relationships determined are indicative of presence of, position of, and rotation of the one or more other objects. For example, the spatial relationships determined may indicate, for each of the one or more other objects, a relative distance and relative angle of the other object to the product.

In one embodiment, the product placement system 200B maintains a pre-determined general object localization model including pre-determined localization bounding boxes for a set of known/common objects occurring in visual content examples 541 of the visual content library 540. Applying the general object localization model to an image (e.g., a visual content example 541) results in placement of a pre-computed localization bounding box around each known/common object occurring in the image.

Next, the product placement profile creator 510 trains a statistical model 513 to determine a natural placement of the product in visual content with respect to one or more other objects in the same visual content based on all spatial relationships determined from the visual content examples 541 with natural occurrences of the product. The resulting learned statistical model 513 represents learned placement patterns related to the product and other similar products (e.g., products of similar type, utility, and/or shape) based on existing visual content. As described later, in the deployment stage, the learned statistical model 513 may be used to determine a distance and an angle relative to an object occurring in a scene that a product placement may be placed/positioned.

Next, in the training stage, the product placement profile creator 510 generates spatial relationship information 514 for the product by computing, based on all spatial relationships determined from the visual content examples 541 with natural occurrences of the product, an average relative scale and an average relative rotation of one or more other objects in the visual content examples 541 to the product.

A resulting product placement profile 521 for the product comprises, but is not limited to, the following: product placement content 522, the learned object detector model 511, the learned object localization model 512, the learned statistical model 513, and the spatial relationship information 514. The product placement content 522 comprises one or more visual representations (e.g., the visual representations 523) and/or audio representations associated with the product, such as an image, a video, a 3D structural model of the product, a song, an announcement of a promotion of the product, etc. The product placement content 522 may be obtained from an advertiser of the product.

In one embodiment, the product placement content 522 may further include metadata, such as audio data to merge with the product placement content 522 in media content in the deployment stage (e.g., media content currently played on the display device 100), and/or purchasing metadata for product advertising, information, and purchasing (e.g., a link to an online site where the product may be purchased from). In the deployment stage, the purchasing metadata may be used by the display device 100 to facilitate purchase of the product by a viewer 30 via an I/O module 140 of the display device 100.

In one embodiment, a product placement profile 521 for a product further comprises one or more pre-defined rules (i.e., requirements, restrictions, permissions, opportunities) such as, but not limited to, placement requirements of an advertiser, placement requirements of a media content provider, semantic requirements of an advertiser, semantic requirements of a media content provider, advertisement campaign details (e.g., duration, budget, demographics), interaction opportunities pre-specified by an advertiser, etc. In one embodiment, an advertiser or a media content provider may pre-specify one or more rules via a user interface 550. The pre-specified rules may be used to select a preferred product placement and/or allow/disallow a product placement. The pre-specified rules may involve different triggers/factors such as, but are not limited to, the following: (1) whether certain objects occurring in visual content are concurrently in view, were in view during a timespan, or were in view during entirety of the visual content, (2) whether certain objects occurring in visual content are in a specified arrangement, (3) information from one or more connected devices (e.g., Internet of Things (IoT) devices), (4) history of past product placements, and (5) viewer feedback.

Via the user interface 550, the product placement system 200B allows a media content provider to register media content produced by the media content provider for product placement, and pre-specify any rule of the media content provider on the product placement. In one embodiment, via the user interface 550, the product placement system 200B allows an advertiser to define a product the advertiser is promoting, upload visual content examples 541 for the product to the visual content library 540, and pre-specify any rule of the advertiser on product placements for the product.

In one embodiment, product placement profiles 521 are generated offline (e.g., on a profile server 500) and then distributed/allocated to the display device 100 where the product placement profiles 521 are used to dynamically identify product placement opportunities in media content currently displayed on the display device 100 and dynamically generate product placements. The product placement system 200B may receive, from the display device 100, viewer feedback and viewer impressions of a product placement.

In one embodiment, some of the product placement profile creator 510 may utilize deep learning technologies (e.g., a convolutional neural network, such as AlexNet, GoogLeNet, etc.) for training one or more learned models (e.g., an object detector model 511, an object localization model 512, a statistical model 513, etc.). In another embodiment, non-deep learning technologies may be utilized instead, such as computer vision solutions, hybrid solutions, machine learning algorithms, etc.

Figure 2C:
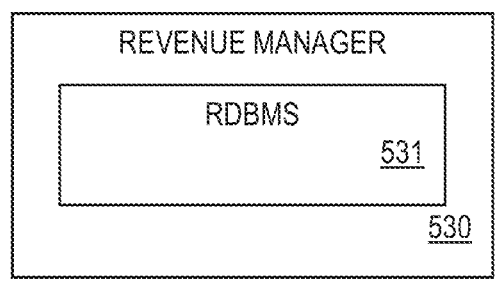
FIG. 2C illustrates an example revenue manager, in one or more embodiments.

FIG. 2C illustrates an example revenue manager 530, in one or more embodiments. The revenue manager 530 is configured to manage sharing of advertisement revenue associated with one or more product placements. In one embodiment, sharing of advertisement revenue associated with a product placement may be based on viewer feedback and viewer impressions of the product placement. The revenue manager 530 maintains a relational database management system (RDBMS) 531 for tracking information associated with parties financially affected by product placements. Examples of parties financially affected by product placements include, but are not limited to, advertisers, media content providers, and original equipment manufacturers (OEMs) (e.g., OEM of the display device 100), and one or more viewers 30 of media content. Examples of information tracked by the RDBMS 531 include, but are not limited to, payments, advertisement revenue, advertisement metrics, etc. For expository purposes, the term "payments" as used herein generally refers to each party's share of advertisement revenue associated with the product (e.g., an amount an advertiser of the product owes to the party). Advertisement revenue associated with a product placement is distributed between parties financially affected by the product placement. In one embodiment, the revenue manager 530 is configured to control distribution of the payments between the parties.

In one embodiment, the revenue manager 530 resides on a remote server. For example, the revenue manager 530 may reside on a profile server 500. As another example, the revenue manager 530 resides on a content server 300 or another remote server.

Figure 3:
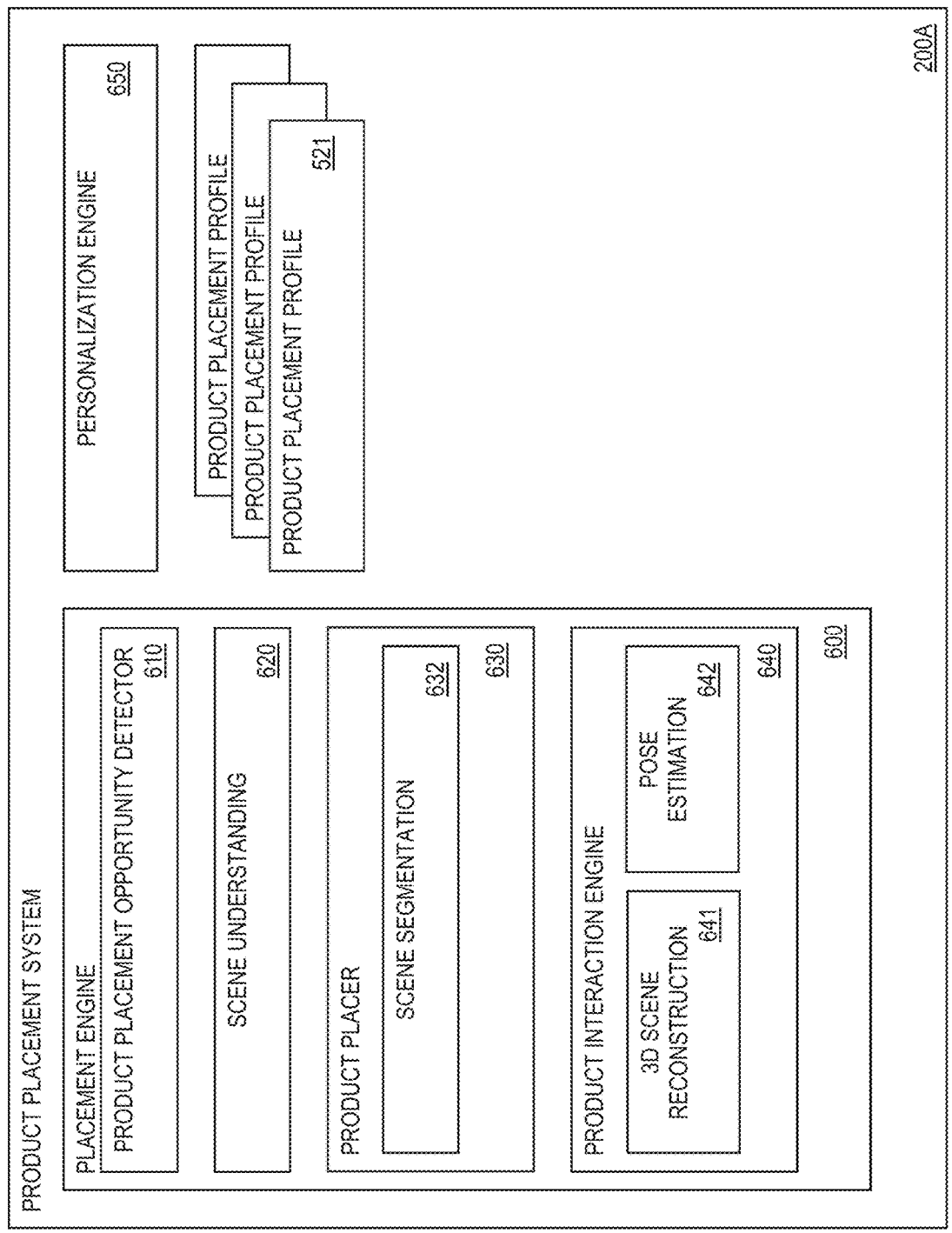
FIG. 3 illustrates an example device-side product placement system in detail, in one or more embodiments.

FIG. 3 illustrates the example device-side product placement system 200A in detail, in one or more embodiments. In one embodiment, the product placement system 200A maintains an internal set of product placement profiles 521 created offline. The product placement system 200A comprises a placement engine 600 configured to: (1) in response to playback of media content currently displayed on the display device 100, determine when to place a product placement for a product in the media content based on the internal set of product placement profiles 521, and (2) dynamically place and merge the product placement in the media content, such that the product placement appears to occur naturally in the resulting media content. As described in detail later herein, in one embodiment, one or more pose estimation algorithms 642 may be applied to manipulate an interaction action between the product placement and another object in the resulting media content.

In one embodiment, the placement engine 600 comprises a product placement opportunity detector 610 configured to, in the deployment stage, perform lightweight processing on a frame of the media content currently displayed to dynamically identify whether there is a product placement opportunity for a product in the frame. Specifically, based on a product placement profile 521 of the internal set, the detector 610 examines the frame to determine whether there is a product placement opportunity for a corresponding product. The detector 610 applies a learned object detector model 511 included in the product placement profile 521 to the frame to detect presence of the product and one or more other objects that fit the product placement profile 521 (e.g., objects that commonly co-occur with the product). The detector 610 identifies a product placement opportunity for the product if the product itself is not included in the frame but one or more other objects that fit the product placement profile 521 are detected (i.e., present in the frame).

In one embodiment, the detection of co-occurring objects in the frame is optional. For example, if the dynamic identification of product placement opportunities is performed offline (e.g., on a profile server 500), the detection may be omitted or relaxed to require only a fraction of the co-occurring objects.

In one embodiment, the placement engine 600 comprises a scene understanding unit 620 configured to: (1) determine what is occurring in a scene of the frame, and (2) determine whether the product placement opportunity identified by the detector 610 enforces semantic requirements of an advertiser of the product and/or semantic requirements of a media content provider of the media content. For example, if the semantic requirements of the advertiser specify that only characters who are heroes use the product, the product placement opportunity identified meets the semantic requirements if the scene involves one or more characters who are heroes. In one embodiment, the scene understanding unit 620 may apply one or more deep learning classifiers to the scene. In another embodiment, the scene understanding unit 620 may apply rule based logical reasoning to metadata for the media content.

In one embodiment, the placement engine 600 comprises a product placer 630 for determining, based on the one or more other objects detected in the frame, a location (i.e., an authorized spot) in the frame to place product placement content 522 included in the product placement profile 521 for the product. In one embodiment, the placer 630 applies a learned object localization model 512 included in the product placement profile 521 to localize the one or more other objects detected in the frame.

In one embodiment, the placer 630 applies a learned statistical model 513 included in the product placement profile 521 to compute one or more average offsets relative to the localized objects in the frame (e.g., average scale, average rotation, etc.). The placer 630 determines coordinates for normal placement of the product placement content 522 in the frame based on the one or more average offsets.

In one embodiment, the placer 630 applies one or more light source detection algorithms on the frame to determine lighting information indicative of one or more illumination sources and light direction from each illumination source.

In one embodiment, the placer 630 dynamically generates, places, and merges a product placement for the product in the frame. Specifically, the placer 630 modifies scale, rotation, and illumination of the product placement content 522 by scaling up/down and rotating the product placement content 522 relative to the localized objects in the frame, and illuminating the product placement content 522 based on the lighting information. In one embodiment, the product placement content 522 may be illuminated utilizing a rendering engine and ray casting. The placer 630 places the resulting modified product placement content 522 in the frame based on the coordinates.

In one embodiment, the placer 630 comprises a scene segmentation unit 632 that may be utilized to enhance localization of an object occurring in a frame. Specifically, when an object localization model 512 is applied to the frame to localize an object occurring in the frame, a localization bounding box is placed around the object. The scene segmentation unit 632 is configured to determine a structural/shape outline of the object based on the localization bounding box placed around the object. To enhance localization of the object, every pixel included in the structural/shape outline is considered part of the object. For example, if the object is a table, the scene segmentation unit 632 is used to determine a structural/shape outline of the table so that every pixel included in the a structural/shape outline is considered part of the table; this may be useful in placing a product placement for a product (e.g., a soft drink of a particular brand) directly on a top of the table instead of appearing to float just above the table.

In one embodiment, the scene segmentation unit 632 is configured to apply one or more models trained for foreground and/or background detection; these models may be utilized if an advertiser specifies one or more constraints associated with placement of a product in the foreground and/or background.

In one embodiment, the placer 600 reports the product placement to an advertiser server 500 for management of revenue sharing associated with the product placement.

In one embodiment, the placement engine comprises a product interaction engine 640 for identifying, based on the one or more other objects detected in the frame and one or more pre-specified interaction opportunities included in the product placement profile 521, one or more interaction actions to trigger in association with the product.

An advertiser may pre-specify what an interaction opportunity is and when the interaction opportunity may be used. For example, assume an advertiser specifies an interaction opportunity that involves a character who is a hero to drink a product (e.g., a can) placed on a table when the hero sits down at the table. The advertiser may specify that the interaction opportunity involves an interaction action to be taken between a can object placed into a frame as a product placement and a human object detected in the same frame (i.e., the human object drinking the can object). The product interaction engine 640 applies one or more pose estimation algorithms 642 to determine pose models for the can object and the human object, wherein each pose model identifies a structural outline of a class (e.g., a stick figure of a human with a number of bendable joints) superimposed over an example of the class (e.g., the hero in the frame). The pose models are only used to manipulate the can object and the human object in the fame; the pose models are not shown/visible to a viewer.

For the interaction opportunity, the advertiser may specify a structural representation of the can object, and locations of various parts of the can object on the structural representation, such as a location of a top of the can object, and a location of a bottom of the can object. The advertiser may specify a structural representation of the human object, and locations of various parts of the human object on the structural representation, such as a location of a right hand of the human object, a location of a mouth of the human object, etc.

For the interaction opportunity, the advertiser may specify a sequence of steps for performing the interaction action to be taken between the two objects. For example, the sequence of steps may be as follows: (1) bring the right hand of the human object to the can object, (2) play audio that sounds like placement of fingers of the human object on the can object (e.g., audio data included in metadata for the product placement content 522), (3) with the right hand of the human object, lift the top of the can object to the mouth of the human object, (4) tilt the mouth of the human object and the can object back about 40 degrees, (5) pause, (6) lower a head of the human object and the can object about 40 degrees, and (7) move the can object and the right hand of the human object back to an initial position. The advertiser may also specify an amount of time take for each step (e.g., pause for a pre-specified period of time).

For the interaction opportunity, the advertiser may specify one or more constraints to trigger/fire the interaction action to be taken between the two objects. An example constraint is requiring co-occurrence of the human object and the can object in the same frame. Another example constraint is that the mouth of the human object must be in view and must not move during the time when the interaction action is about to be taken.

When the interaction action to be taken between the two object is triggered, the product interaction engine 640 creates the interaction action by manipulating the pose models for the can object and the human object. The pose models may be bent at its joints to perform the sequence of steps specified. For example, skin (i.e., surface) of the human object may move in accordance with the pose model for the human object, and sections that are not in view may be skinned with appropriate texture by applying one or more 3D scene reconstruction algorithms 641.

For the interaction opportunity, the advertiser may specify inclusion of a brief pause to interrupt a normal flow of a scene in the frame and allow the human object to take a drink from the can object. Alternatively, the advertiser may want to integrate the interaction action taken between the two objects seamlessly without pausing any other action taking place in the scene (i.e., any other action continues uninterrupted). For example, if the human object is listening to another human object in the frame who is speaking, the human object may take a sip from the can object without interrupting the other human object who is speaking, thereby increasing realism of the product placement.

The interaction opportunity may also involve one or more other objects in the frame performing an action to indicate the objects' awareness of the can object. For example, another human object in the frame may glance at the can object, remark upon the can object, move the can object, or even manipulate the can object. One or more 3D scene reconstruction algorithms 641 and/or pose estimation algorithms 642 may be applied to manipulate an object in the frame and viewing the object from different directions.

In one embodiment, the product interaction engine 640 is optional; a list of advertiser based interaction opportunities may be utilized instead of the product interaction engine 640.

The product placement system 200A comprises a personalization engine 650 configured to filter out potential product placements to place in the media content based on personal information of a viewer 30 of the display device 100. In one embodiment, for each potential product placement to place in the media content, the personalization engine 650 assigns a value score to the potential product placement based on the personal information and corresponding potential advertisement revenue. If two or more potential product placements to place in the media content are for two or more competing products (e.g., two or more different brands of soft drink), the personalization engine 650 ranks the potential product placements based on its value scores, and places only the product placement with the highest value score.

In one embodiment, the personalization engine 650 is configured to record viewer feedback and viewer impressions of a product placement placed in the media content, and return the viewer feedback and the viewer impressions to a remote server, such as, but not limited to, a profile server 500.

In one embodiment, the personalization engine 650 is configured to enable/disable a product placement placed in the media content based on viewer interaction with the product placement or viewer impressions of the product placement. For example, a viewer 30 may interact with a product placement via an I/O module 140 of the display device 100, such as purchasing a product associated with the product placement with the push of a button, highlighting and rating the product placement, selectively disabling the product placement with the push of a button, and other UI functionalities. As another example, a sensor module 150 of the display device 100 may capture viewer impressions of the product placement (e.g., the viewer 30 provides a thumbs up showing approval, thereby enabling the product placement and similar product placements in the future).

In one embodiment, if the placement engine 600 identifies two or more potential product placements to place in the same frame and coordinates for the product placements overlap, only the product placement with a highest value score computed by the personalization engine 650 is placed in the frame.

In one embodiment, dynamic product placements are performed on device (i.e., on the display device 100) for any type of media content displayable on the display device 100, thereby supporting personalization and preserving viewer privacy as the product placement is not performed on a central server. Personalization of the product placements may be based on different types of contextual information. For example, personalization of the product placements may be based on at least one of: current viewer experience, usage of the display device, information from one or more connected devices (e.g., IoT devices located in an environment of a viewer, such as information captured by a smart refrigerator identifying a preferred brand of soft drink available in the refrigerator), location, time, date, or a combination thereof.

In another embodiment, dynamic product placements are performed offline (e.g., on a remote server such as, but not limited to, a profile server 500) during streaming of media content to the display device 100, and included in the streaming.

In one embodiment, the product placement system 200A allows changes/updates to product placements in existing content. For example, if an object detector model 511 applied to a frame in the existing content detects a prior/older version of an object occurring in the frame, the product placement system 200A replaces/updates the object with product placement illustrating an updated/newer version of the object (e.g., replacing an old style of can object occurring in the frame with a new style of can object, replacing an old company/brand logo with a new company/brand logo, replacing an old cell phone model with a new cell phone model, etc.).

In one embodiment, if the media content comprises a game, the product placement system 200A allows placements of or updates to real objects in the game.

In one embodiment, the product placement system 200A allows for real-time audio placement in media content. Audio placement comprises the placement of audio content (i.e., sound) based on an analysis of the media content in real-time. For example, if a scene included in a frame of the media content shows people walking on a street and there's only background noise accompanying this scene, the product placement system 200A may replace the background noise with other audio content, such as an advertisement jingle, a public service announcement, etc. As another example, an audio placement may accompany a product placement (i.e., both are merged into a scene) to give a viewer 30 a more immersive experience.

In one embodiment, the product placement system 200A allows for motion adaption. For example, when placing an object in a scene, the motion of the object may move in concert with other motions in the scene. If a scene shows a tornado, the motion of a product placement placed into the scene is consistent with the motion of other objects included in the scene and affected by the tornado. As another example, when placing an object in a scene, the motion of the object is detached from other motions in the scene. If a scene shows a crash, a product placement placed into the scene may be still/motionless whereas the motion of other objects included in the scene is affected by the crash.

In one embodiment, the product placement system 200A allows for device-specific object placements. An object placement placed into media content may be limited by capabilities of a display device 100 currently displaying the media content, such that different display devices 100 with different capabilities may show different object placements. An object placement placed into media content may be adapted based on display characteristics of a display device 100 currently displaying the media content, such that different display devices 100 with different display characteristics may show object placements of different resolutions.

Figure 4B:
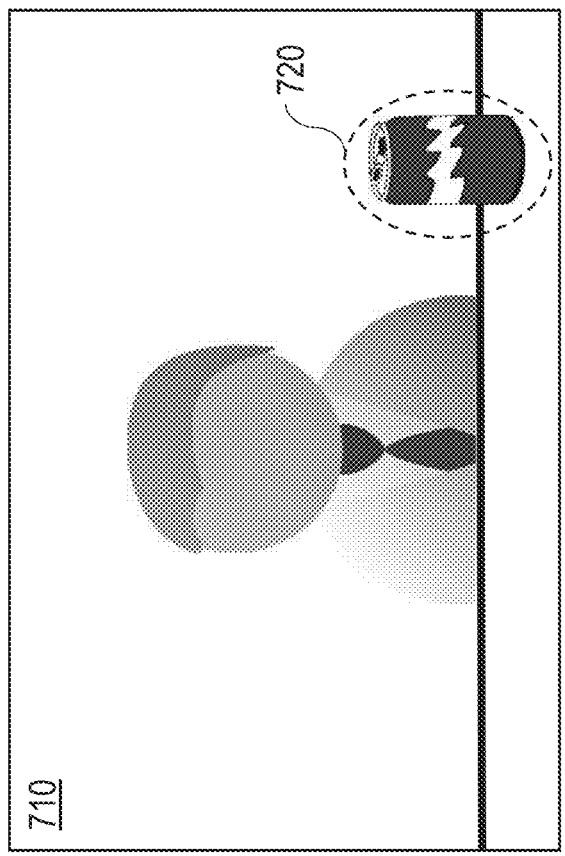
FIG. 4B illustrates a modified frame of a media content, in one or more embodiments.
Figure 4A:
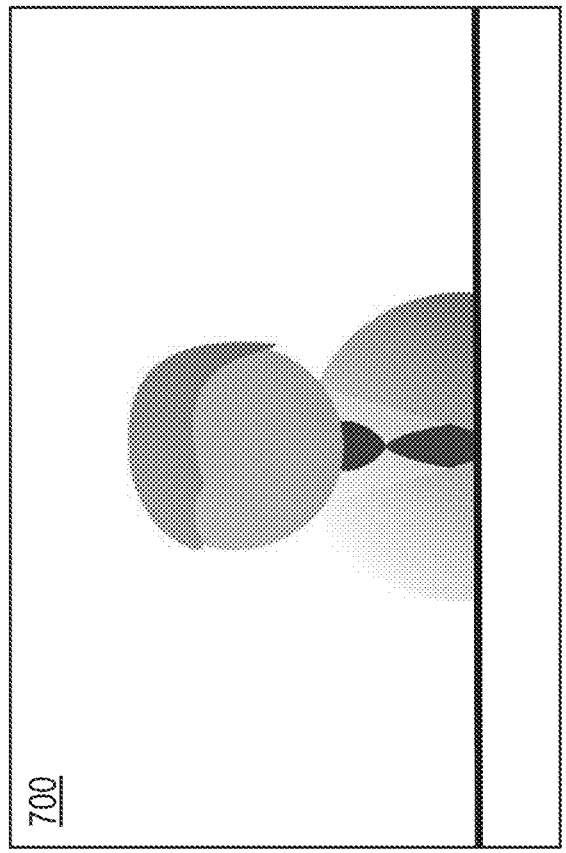
FIG. 4A illustrates an example frame of a media content.

FIG. 4A illustrates an example frame 700 of a media content. As shown in FIG. 4A, the frame 700 includes a scene involving a television host sitting behind a desk. The frame 700 does not include any product placement.

FIG. 4B illustrates a modified frame 710 of a media content, in one or more embodiments. The modified frame 710 includes the same scene included in the frame 700 (FIG. 4A) but with the placement of a product placement 720 representing a soft drink of a particular brand. The product placement 720 is placed on the desk so that the product placement 720 appears natural to a viewer (as a soft drink on a desk/table is a natural occurrence).

FIG. 5 is a flowchart of an example process 800 for generating a dynamic product placement, in one or more embodiments. In process block 801, identify a product placement opportunity for a product in a frame of a piece of content during playback of the piece of content on a display device. In process block 802, determine a location in the frame to place product placement content for the product based on a learned statistical model representing learned placement patterns related to the product. In process block 803, modify the product placement content based on one or more objects present in the frame. In process block 804, place a product placement for the product in the piece of content by placing the modified product placement content in the frame based on the location, where the modified product placement content appears to occur naturally in the piece of content.

In one embodiment, process blocks 801-804 may be performed by one or more components of the device-side product placement system 200A, such as, but not limited to, the placement engine 600.

Figure 6:
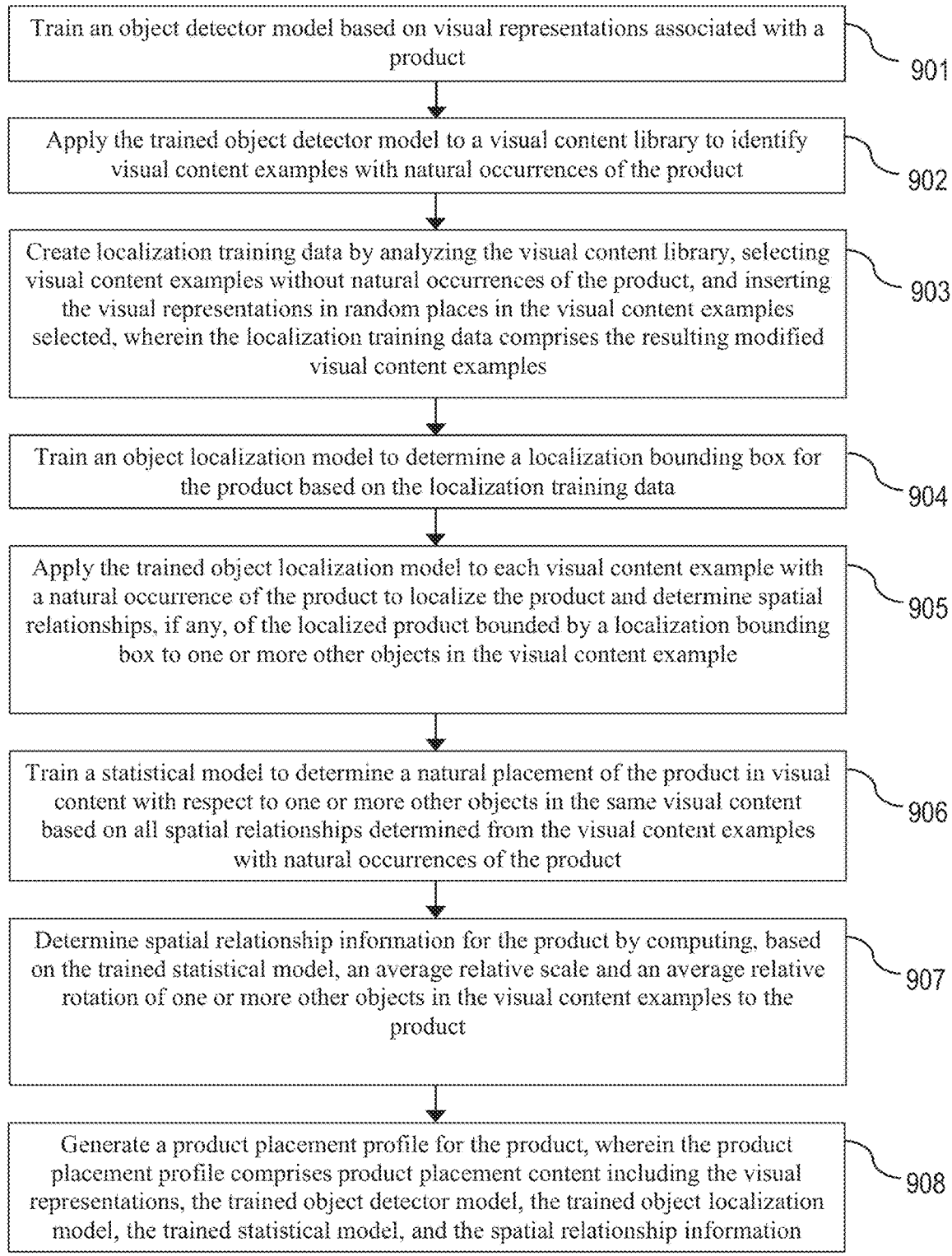
FIG. 6 is a flowchart of an example process for generating a product placement profile, in one or more embodiments.

FIG. 6 is a flowchart of an example process 900 for generating a product placement profile, in one or more embodiments. In process block 901, train an object detector model based on visual representations associated with a product (e.g., visual representations provided by an advertiser of the product). In one embodiment, the object detector model may be trained utilizing deep learning technologies (e.g., a convolutional neural network, such as AlexNet, GoogLeNet, etc.) or non-deep learning technologies (e.g., computer vision solutions, hybrid solutions, machine learning algorithms, etc.).

In process block 902, apply the trained object detector model to a visual content library to identify visual content examples with natural occurrences of the product.

In product block 903, create localization training data by analyzing the visual content library, selecting visual content examples without natural occurrences of the product, and inserting the visual representations in random places in the visual content examples selected, wherein the localization training data comprises the resulting modified visual content examples. In process block 904, train an object localization model to determine a localization bounding box for the product based on the localization training data.

In process block 905, apply the trained object localization model to each visual content example with a natural occurrence of the product to localize the product and determine spatial relationships, if any, of the localized product bounded by a localization bounding box to one or more other objects in the visual content example. In process blow 906, train a statistical model to determine a natural placement of the product in visual content with respect to one or more other objects in the same visual based on all spatial relationships determined from the visual content examples with natural occurrences of the product.

In process block 907, determine spatial relationship information for the product by computing, based on the trained statistical model, an average relative scale and an average relative rotation of one or more other objects in the visual content examples to the product. In process block 908, generate a product placement profile for the product, wherein the product placement profile comprises the product placement content, the trained object detector model, the trained object localization model, the trained statistical model, and the spatial relationship information.

In one embodiment, process blocks 901-908 may be performed by one or more components of the server-side product placement system 200B, such as, but not limited to, the product placement profile creator 510.

Figure 7:
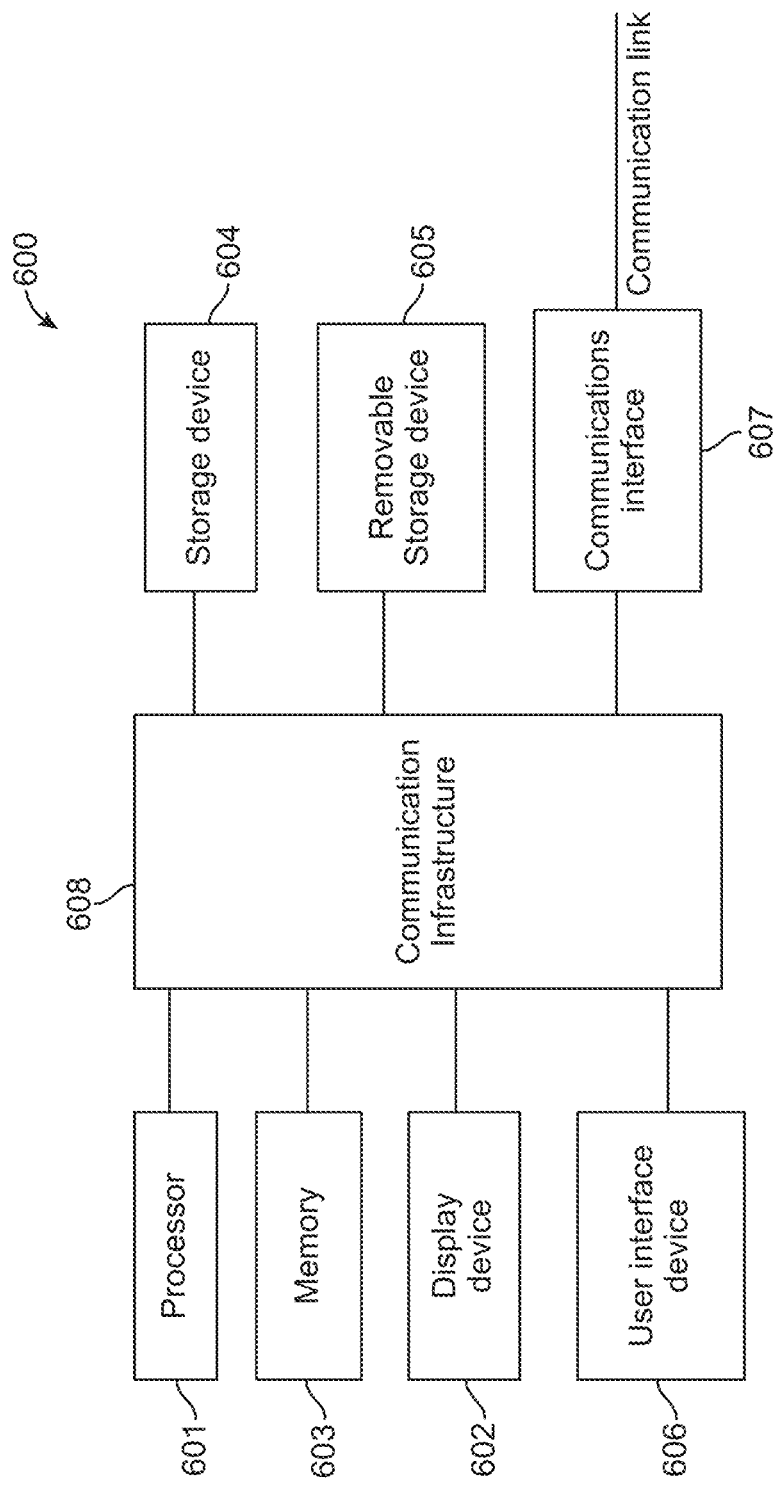
FIG. 7 is an exemplary high-level block diagram showing an information processing system comprising a computer system useful for implementing disclosed embodiments.

FIG. 7 is a high-level block diagram showing an information processing system comprising a computer system 600 useful for implementing the disclosed embodiments. Computer system 600 may be incorporated in a display device 100 or a server device (e.g., a profile server 500). The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including a product oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    identifying a product placement opportunity for a product in a frame of a piece of content during playback of the piece of content on a display device based on an occurrence of a first object related to the product in the frame;
    determining a location in the frame to place product placement content associated with the product based on a localization of the first object related to the product and a learned statistical model representing learned placement patterns related to the product, wherein the learned placement patterns are indicative of a natural placement of the product relative to the first object related to the product; and
    placing the product placement content in the piece of content by inserting a second object modified from the product placement content in the frame based on the location, wherein the first object related to the product and the second object are different objects.

2. The method of claim 1, wherein the first object and the second object are concurrently in view in the frame.

3. The method of claim 1, further comprising:
    receiving a product placement profile for the product, wherein the product placement profile includes the product placement content, one or more placement instructions for placing the product placement content in media content, and information indicative of one or more objects related to the product and co-occur with the product in one or more other pieces of content.

4. The method of claim 3, wherein identifying a product placement opportunity for a product in a frame comprises:
determining whether the product and the first object are present in the frame by applying a learned object detector model to the frame, wherein the first object fits the product placement profile, and the product placement opportunity is identified in response to determining that the product is not present in the frame but the first object is present in the frame.

5. The method of claim 1, wherein determining a location in the frame to place product placement content associated with the product comprises:
applying a learned object localization model to the frame to localize the first object;
applying the learned statistical model to the frame to compute one or more average offset values relative to the localized first object; and
determining coordinates for the location based on the one or more average offset values.

6. The method of claim 5, further comprising:
scaling and rotating the product placement content relative to the localized first object; and
illuminating the product placement content based on lighting information indicative of one or more illumination sources in the frame and light direction from each illumination source.

7. The method of claim 1, further comprising:
reporting placement of the product placement content in the piece of content to a server managing sharing of advertisement revenue associated with the placement.

8. The method of claim 1, further comprising:
obtaining contextual information associated with at least one of: a viewer of the display device, an environment of the viewer, the display device, time, date, location, information captured by one or more other devices connected to the display device, or a combination thereof; and
modifying the product placement content based on the contextual information.

9. The method of claim 1, further comprising:
detecting viewer interaction with the product placement content, wherein the viewer interaction comprises at least one of viewer feedback or a viewer impression; and
invoking an action based on the viewer interaction, wherein the action includes at least one of: purchasing the product from an online site, disabling the product placement content, rating the product placement content, redirecting to additional content, or a combination thereof.

10. The method of claim 3, further comprising:
identifying an interaction opportunity between the product and the first object based on the product placement profile;
determining pose models for the product and the first object; and
generating an interaction action between the product and the first object by manipulating the pose models.

11. The method of claim 1, wherein the product placement content comprises at least one of visual content or audio content related to the product.

12. A system, comprising:
at least one processor; and
a non-transitory processor-readable memory device storing instructions that when executed by the at least one processor causes the at least one processor to perform operations including:
identifying a product placement opportunity for a product in a frame of a piece of content during playback of the piece of content on a display device based on an occurrence of a first object related to the product in the frame;
determining a location in the frame to place product placement content associated with the product based on a localization of the first object related to the product and a learned statistical model representing learned placement patterns related to the product, wherein the learned placement patterns are indicative of a natural placement of the product relative to the first object related to the product; and
placing the product placement content in the piece of content by inserting a second object modified from the product placement content in the frame based on the location, wherein the first object related to the product and the second object are different objects.

13. The system of claim 12, the operations further comprising:
receiving a product placement profile for the product from a server, wherein the product placement profile includes the product placement content, one or more placement instructions for inserting the product placement content in visual content, and information indicative of one or more objects related to the product and co-occur with the product in one or more other pieces of content.

14. The system of claim 13, wherein identifying a product placement opportunity for a product in a frame comprises:
determining whether the product and the first object are present in the frame by applying a learned object detector model to the frame, wherein the first object fits the product placement profile, and the product placement opportunity is identified in response to determining that the product is not present in the frame but the first object is present in the frame.

15. The system of claim 12, wherein determining a location in the frame to insert product placement content for the product comprises:
applying a learned object localization model to the frame to localize the first object;
applying the learned statistical model to the frame to compute one or more average offset values relative to the localized first object; and
determining coordinates for the location based on the one or more average offset values.

16. The system of claim 15, the operations further comprising:
scaling and rotating the product placement content relative to the localized first object; and
illuminating the product placement content based on lighting information indicative of one or more illumination sources in the frame and light direction from each illumination source.

17. The system of claim 12, the operations further comprising:
obtaining contextual information associated with at least one of: a viewer of the display device, an environment of the viewer, the display device, time, date, location, information captured by one or more other devices connected to the display device, or a combination thereof; and modifying the product placement content based on the contextual information.

18. A method comprising:

generating a product placement profile for a product based on one or more pieces of visual content with natural occurrences of the product, wherein the product placement profile comprises product placement content for the product, one or more placement instructions for inserting the product placement content in visual content, and data indicative of a first object related to the product and co-occurs with the product in the one or more pieces of visual content; and sending the product placement profile to a display device to allow the display device to dynamically insert a second object modified from the product placement content in a frame of a piece of content during playback of the piece of content based on the product placement profile and an occurrence of the first object related to the product in the frame, wherein the first object related to the product and the second object are different objects.

19. The method of claim 18, wherein generating a product placement profile for a product comprises:

training an object detector model to detect the product in visual content based on a first set of training data comprising the one or more pieces of visual content;

training an object localization model to determine a localization bounding box for the product in visual content based on a second set of training data comprising one or more other pieces of visual content including visual representations of the product inserted at random; and training a statistical model to determine a normal placement of the product in visual content with respect to the first object in the same visual content based on one or more spatial relationships of the product to the first object in the first set of training data.

20. The method of claim 19, wherein generating a product placement profile for a product comprises:

receiving one or more pre-specified rules on placement of the product placement content in visual content from an advertiser or a content provider via a user interface.

* * * * *